United States Patent [19]

Goggins

[11] Patent Number: 5,390,474
[45] Date of Patent: Feb. 21, 1995

[54] METHOD FOR PACKAGING VEHICLE BODY PANELS

[76] Inventor: John D. Goggins, 1136 E. Main St., Flushing, Mich. 48433

[21] Appl. No.: 7,154

[22] Filed: Jan. 21, 1993

[51] Int. Cl.⁶ .............................................. B65B 7/20
[52] U.S. Cl. ........................................ 53/467; 53/458; 229/247
[58] Field of Search ................. 229/247; 410/32, 43; 414/331, 332, 373, 400; 53/249, 250, 390, 458, 467, 468, 566, 247, 251, 252, 539, 393, 578, 579, 246; 211/41, 189; 280/79.3

[56] References Cited

U.S. PATENT DOCUMENTS

| 1,677,439 | 7/1928 | Fulton | 211/189 |
|---|---|---|---|
| 2,415,292 | 2/1947 | Lamb, Jr. et al. | 53/467 |
| 2,493,583 | 1/1950 | Johnson | 53/467 |
| 3,250,056 | 5/1966 | Rudszinat et al. | 53/251 X |
| 3,645,068 | 2/1972 | Langen | 53/566 |
| 3,735,561 | 5/1973 | Wood | 53/246 X |
| 3,744,647 | 7/1973 | Jelinek | 410/43 X |
| 3,797,842 | 3/1974 | Swick et al. | 280/79.3 X |
| 3,873,115 | 3/1975 | Shiflet | 280/79.3 X |
| 4,247,245 | 1/1981 | Stolt et al. | 53/246 X |
| 4,333,602 | 6/1982 | Geschwender | 229/247 X |
| 4,358,918 | 11/1982 | Groom et al. | 53/467 X |
| 4,492,070 | 1/1985 | Morse et al. | 53/566 X |
| 4,556,167 | 12/1985 | Fox et al. | 229/247 X |
| 4,621,969 | 11/1986 | Berghall et al. | 53/247 X |
| 4,633,655 | 1/1987 | Nigrelli | 53/252 X |
| 4,777,783 | 10/1988 | Zald | 53/247 X |
| 4,833,866 | 5/1989 | Newton et al. | 53/246 X |
| 4,862,677 | 9/1989 | Roberts et al. | 53/246 X |
| 4,895,382 | 1/1990 | Andersson | 280/79.3 X |
| 4,976,092 | 12/1990 | Shuert | 53/475 |

*Primary Examiner*—John Sipos
*Assistant Examiner*—Daniel Moon
*Attorney, Agent, or Firm*—Young, MacFarlane & Wood

[57] ABSTRACT

The invention is a method of packaging items of manufacture as they leave the assembly line. A plurality of pre-manufactured containers is grouped together on a standard shipping and storage rack. The closure of each container is opened, presenting, in effect, a plurality of cavities. As each container is filled, it is closed using a reusable closure means, such as Velcro. When all containers on an individual rack have been filled, the individual rack is removed for subsequent storage and shipment.

2 Claims, 2 Drawing Sheets

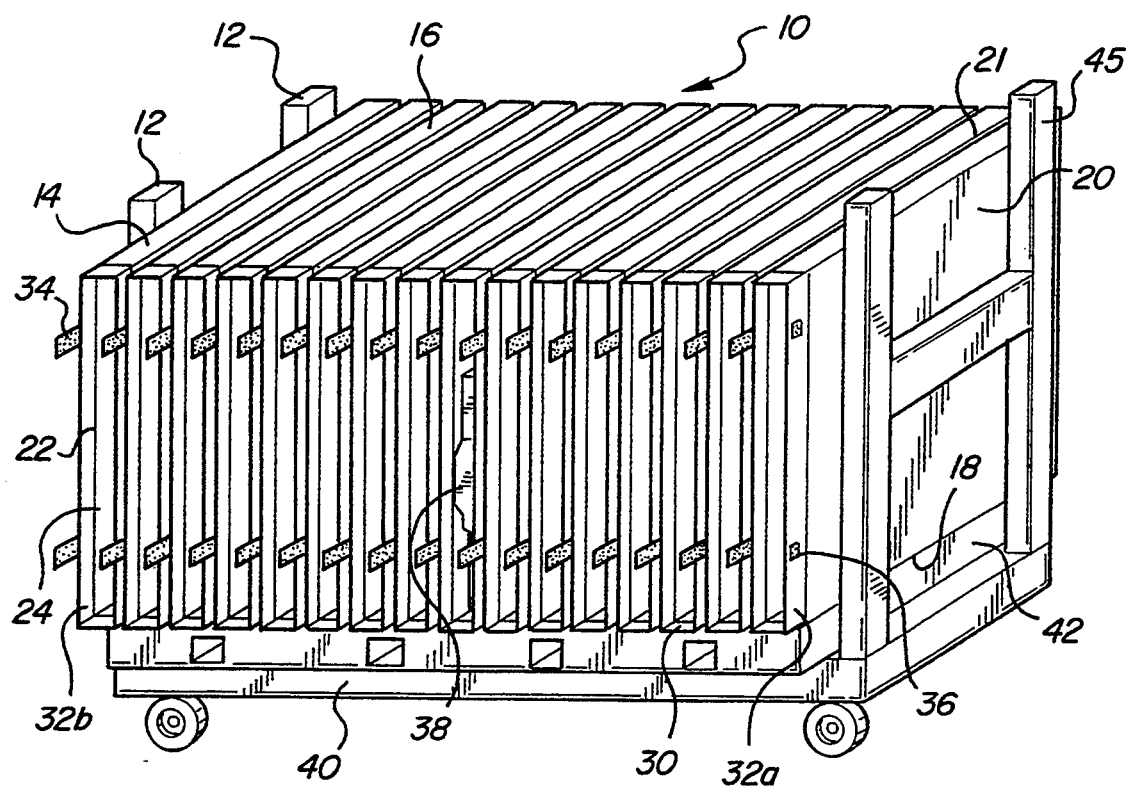
FIG-1
FIG-2
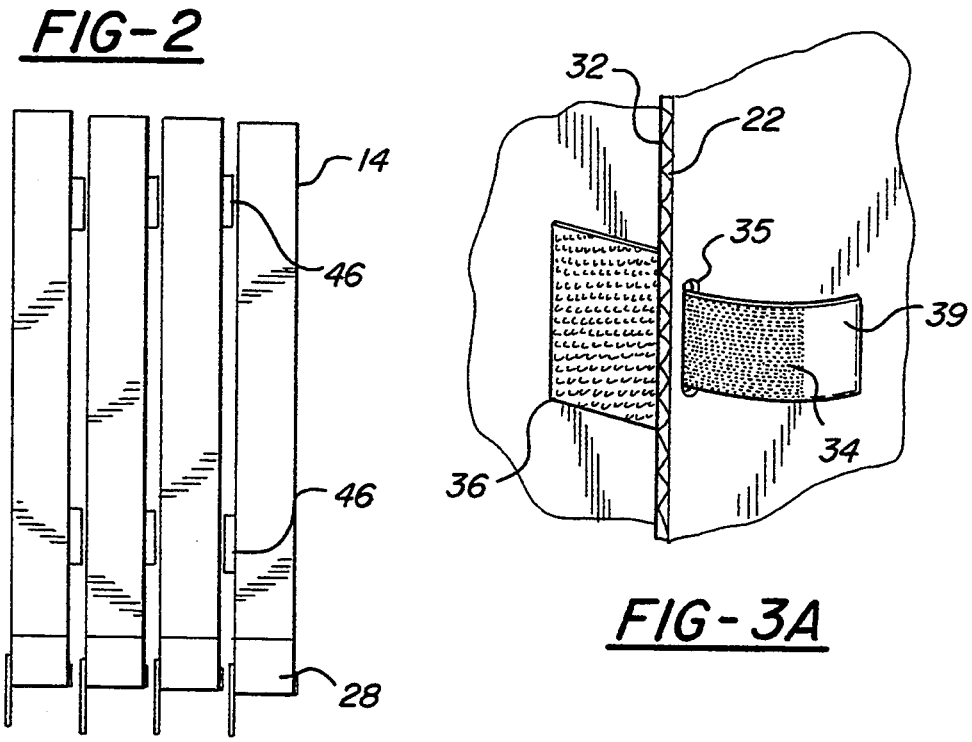
FIG-3A

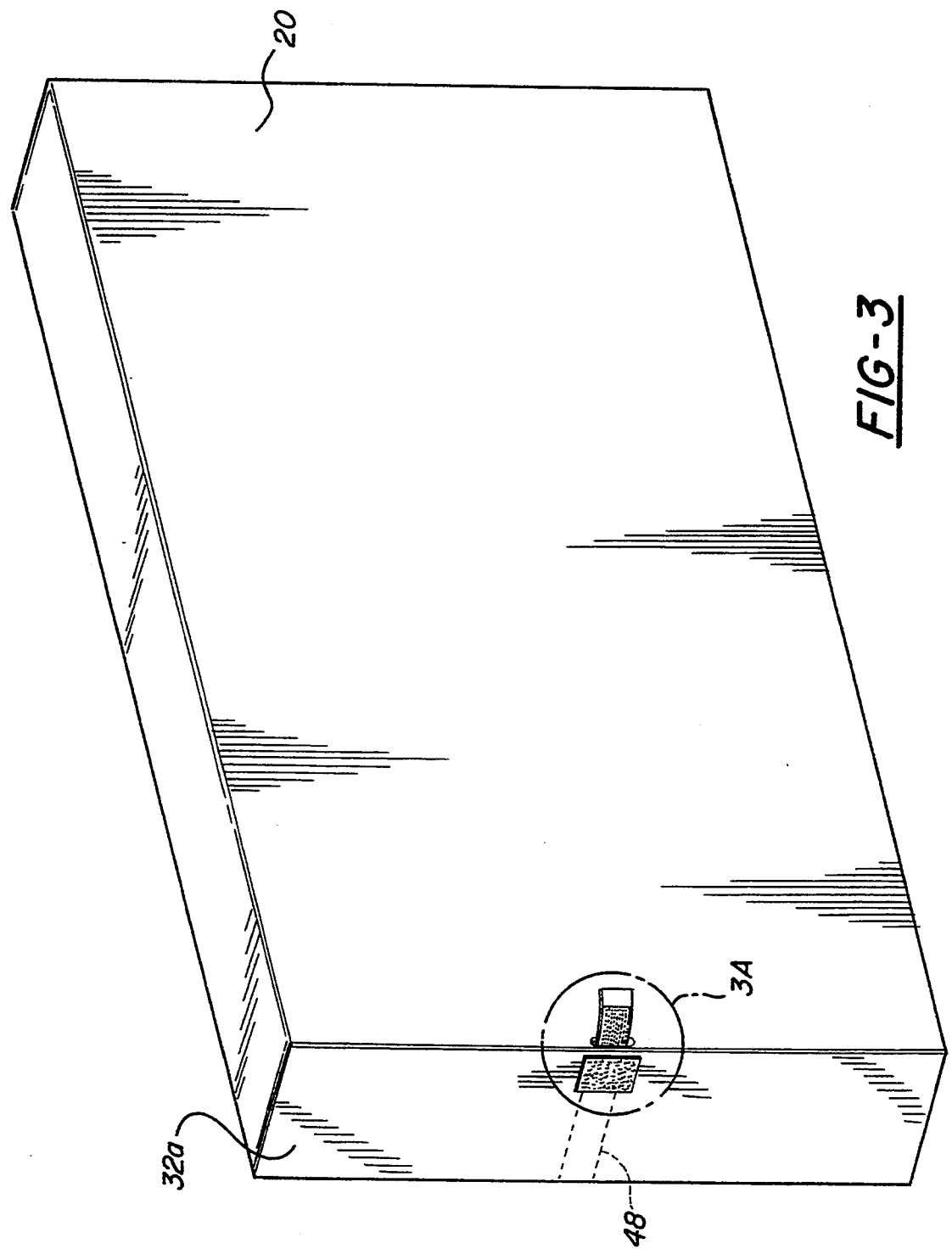

METHOD FOR PACKAGING VEHICLE BODY PANELS

FIELD OF THE INVENTION

The invention pertains to methods for packaging vehicle body panels, and more particularly, accomplishing said packaging by the use of pre-assembled containers.

BACKGROUND OF THE INVENTION

Automobiles and trucks which have sustained body damage from accidents or weathering are frequently repaired at both authorized automotive manufacturers' dealerships, as well as independent motor vehicle body repair shops. Manufacturers of body panels for motor vehicles, such as automobiles and trucks, dedicate a substantial portion of their production capability to the manufacture of body panels for this service and repair industry.

To supply the repair industry, motor vehicle manufacturers ship large numbers of vehicle body panels from manufacturing plants to various locations around the world. Because vehicle body panels are extremely susceptible to damage during handling and shipment, manufacturers of these parts expend a substantial amount of time and effort in packaging said body panels for shipment. This effort includes the design of specialized containers and equipment for packaging parts as they leave the production line.

Typically, an unfolded corrugated cardboard carton stack is placed in proximity to the discharge end of the manufacturer's paint processing line. At this point, the body panel has been completely manufactured, coated with primer or primer and paint, and allowed to dry. The part is removed from the conveyor and placed by hand on the top of the unfolded container. The container is then formed, by folding, to surround the completed part, and secured with adhesives. Frequently, the completed container is then further secured with metal or plastic straps, bands or tape. The completed container is then physically carried to a standard size storage and transportation rack. Each said rack is capable of holding a number of assembled containers. When the rack is filled, it is moved from the assembly line area to the storage or shipping area for further processing.

Present methods are unacceptable for a number of reasons. First, the process of physically manufacturing the completed container from a carton blank is time consuming. Further, assembly line workers, under a certain amount of pressure to maintain a steady volume of parts moving through the assembly line process, frequently do a poor job of completing the construction of the container. The assembly of containers of this nature is likewise a poor utilization of human resources; such containers can frequently be made safer, faster, and at lower cost by machine, or by the use of dedicated container assembly labor at container manufacturing plants. Because of the time constraints of container manufacture at the assembly line, a production bottleneck exists at the packaging end of the assembly line, limiting the number of parts which can be economically manufactured and stored for packaging. Further, when the completed container is placed in the rack, until such time as the rack is completely filled, the individual containers are prone to tipping, sometimes causing damage to the container and its contents, and generally making the process of loading the storage and shipping rack difficult, at best. The use of plastic and metal banding materials is undesirable in a modern packaging environment, inasmuch as these particular strapping components are generally non-recyclable, adding to both packaging and disposal costs.

Finally, it is important for the ultimate recipient of the completed container and its cargo to have the option of inspecting the cargo. At the present time, such containers are typically provided with a non-reusable closure, such as tape or bands. This makes it difficult for the recipient to open and reseal the container, a process which may have to be performed many times during the transportation, handling and storage of the container and its associated cargo.

The present invention overcomes all of the foregoing shortcomings.

SUMMARY OF THE INVENTION

The invention is a method for packaging vehicle body panels based on the pre-assembly and grouping of quick sealing containers, utilizing disposable pallets and standard storage and shipping racks. By pre-loading standard storage and shipping racks and pre-assembled containers which are glued together and mounted on disposable pallets, vehicle body panel components may be quickly and easily packaged. An re-usable closure, such as Velcro TM is applied to the container to permit fast sealing of the containers, while still permitting inspection of the contents.

BRIEF DESCRIPTION OF THE DRAWINGS

FIG. 1 is a perspective view of a standard storage and shipping rack equipped with pre-manufactured containers according to the present invention.

FIG. 2 is a top view of a group of individual containers depicting various important elements of the invention.

FIG. 3 is a perspective view of an individual container, and FIG. 3A is a detail view of the closure

DETAILED DESCRIPTION OF THE PREFERRED EMBODIMENT

The method herein described will be best understood first by reference to FIG. 1. A shipping and storage rack 12 is comprised of a base 40 and a plurality of upright members 45 providing a substantially rigid support structure for a plurality of pre-assembled containers 14. Said containers are preferably formed from corrugated board, cardboard or the like, and typically, have a top 16, a bottom 18, opposing sides 20, and 21, and opening 24. Top 16, bottom 18 and sides 20 are provided with a top flap 28, bottom flap 30 and side flaps 32. One of the side flaps 32 are provided with a closure strip 34, which is preferably manufactured from a flexible fabric closure material similar to that sold under the trade name "Velcro", or a similar hook and loop-type fastener. On the opposing side flap is a closure pad 36, comprised of a mating Velcro material and so disposed as to permit the closure of container 14 by folding top flap 28 and bottom flap 30 inward over the opening 24, folding first side flap bearing closure pads 36 over the opening 24, and thereafter closing the second side flap 32 over the first side flap, and causing closure strip 34 to engage closure pad 36, thereby closing the container 14.

Preferably, a disposable pallet 42, constructed of corregated board or similar material, is placed on the base 40 of rack 12. A plurality of containers 14 are placed on the upper surface of the pallet 42, in sufficient numbers to fill rack 12 from end to end. Optionally, as shown in FIG. 2, groups of containers 14 may be secured together by spots of adhesive 46. In this fashion, a multi-pack of containers 14 may be created by selecting the number of containers to which adhesive is supplied as the rack 12 is loaded with containers 14.

Containers 14 are placed on the rack 12 between upright members 45 so that all openings 24 are oriented toward the same side of rack 12. At the time the rack 12 is loaded with containers 14, the top flaps, bottom flaps, and side flaps of all containers 14 are in the opened position. The combined container and rack group 10 is then transported to the discharge end of a component assembly line. As components 38 are removed from the assembly line, they are placed into the openings 24 of containers 14, and the loading process is continued until all containers 14 have been loaded with components 38. Closure of containers 14 may take place immediately after loading each container 14 with component 38, or, alternately, all containers 14 may be loaded with components 38 and thereafter, all containers closed in a continuous operation, in the fashion above described.

After loading of components 38 into containers 14, and after all containers 14 on an individual rack 12 have been loaded and closed, container rack group 10 is then transported away from the assembly line to a position suitable for storage or further shipment of the loaded rack 12.

Referring now to FIG. 3 and detail view of FIG. 3A, the assembly and operation of the closure can be best understood. FIG. 3 depicts an assembled container provided with a single closure. The details of the attachment of the closure are shown in FIG. 3A. Side 20 is provided with a slot 35 adjoining scoring line 22. Closure strip 34 is affixed to the inside of side flap 32b using an adhesive tape strip 48. One end of closure strip 34 protrudes through slot 35. Side flap 32b is folded inward until it is perpendicular with sides 20, and thereafter, side flap 32a is folded over side flap 32b. Closure strip 34 is then folded forward to engage closure pad 36. Tab portion 39 of closure strip 36 permits grasping of the closure strip 34 for releasing closure strip 34 from its engagement with closure pad 36. In this fashion, flap 32a can be releasably secured from its contact with flap 32b.

Having thus described my invention, it will be obvious to one skilled in the art that numerous modifications to the methodology above-described may be easily made, without departing from the invention, which I claim as follows:

1. A method of packaging manufactured components comprising:
    preassembling a container having parallel upstanding side walls of a major dimension, parallel bottom and top walls of a minor dimension, an opening at one end of the container defined by end edges of said side walls and said top and bottom walls, and closure flap means proximate said opening;
    grouping a plurality of said containers on a substantially rigid discrete portable storage rack with the side walls upstanding and the containers arranged in parallel side by side relation on the rack;
    delivering said containers and said rack, as a rack/container assembly, to a discharge point of a component manufacturing line;
    loading a manufactured component discharged from said component manufacturing line into each container by passing the component through the end opening of the container;
    moving the closure flap means on each container into a position closing the end opening of the container;
    transporting said rack/container assembly away from said component manufacturing line; and
    sealing the closure flap means following the movement of the closure flap means to the closed position;
    the closure flap means comprising a first end flap hingedly connected to an end edge of one of said side walls and a second end flap hingedly connected to an end edge of the other of said side walls;
    the step of moving said closure flap means into a position closing the end opening of the container comprising pivoting the first and second flaps about their hinge connections to the side walls to a position closing the opening;
    the step of sealing the closure flap means comprising providing a hook type fabric closure element on said first end flap, providing a loop type closure element on said second end flap and, following the hinge movement of the end flaps to a position closing the opening, releasably engaging the hook element with the loop element;
    the closure element on one of said end flaps comprising a closure strip secured at one end thereof to an inboard face of said one end flap and then passing through a slot in the adjacent side wall proximate the hinge connection between said one end flap and the adjacent side wall to define an operative closure strip end;
    the fastener element on the other end flap comprising a closure pad secured to the outboard face of said other end flap;
    following movement of said one end flap to its position closing the opening followed by movement of said other end flap to a position overlying said one end flap, securing the operative closure strip end to the exposed outboard face of the closure pad to releasably seal the container.

2. A method of packaging manufactured components comprising:
    preassembling a container having parallel upstanding side walls of a major dimension, parallel bottom and top walls of a minor dimension, an opening at one end of the container defined by end edges of said side walls and said top and bottom walls, a first end flap connected by a hinge connection to an end edge of one of said side walls, a second end flap connected by a hinge connection to an end edge of the other of said side walls, a hook/loop type closure strip secured at one end thereof to an inboard face of said first end flap and then passing through a slot in the adjacent side wall proximate the hinge connection between said first end flap and the adjacent side wall to define an operative closure strip end, and a hook/loop type closure pad positioned on an outboard face of said second end flap;
    grouping a plurality of said containers proximate a discharge point of a component manufacturing line;
    loading a manufactured component discharged from the component manufacturing line into each container by passing the component through the end opening of the container;

pivoting said first end flap of the container about its hinge connection to the adjacent side wall to a position closing the opening;

thereafter pivoting said second end flap of the container about its hinge connection to the adjacent side wall to a position overlying said first end flap; and securing the operative closure strip end to the exposed outboard face of the closure pad to releasably seal the container.

* * * * *